C. W. BRAY.
MECHANISM FOR DOUBLING OR MATCHING METAL PLATES.
APPLICATION FILED NOV. 17, 1905.
907,121.
Patented Dec. 22, 1908.
2 SHEETS—SHEET 1.
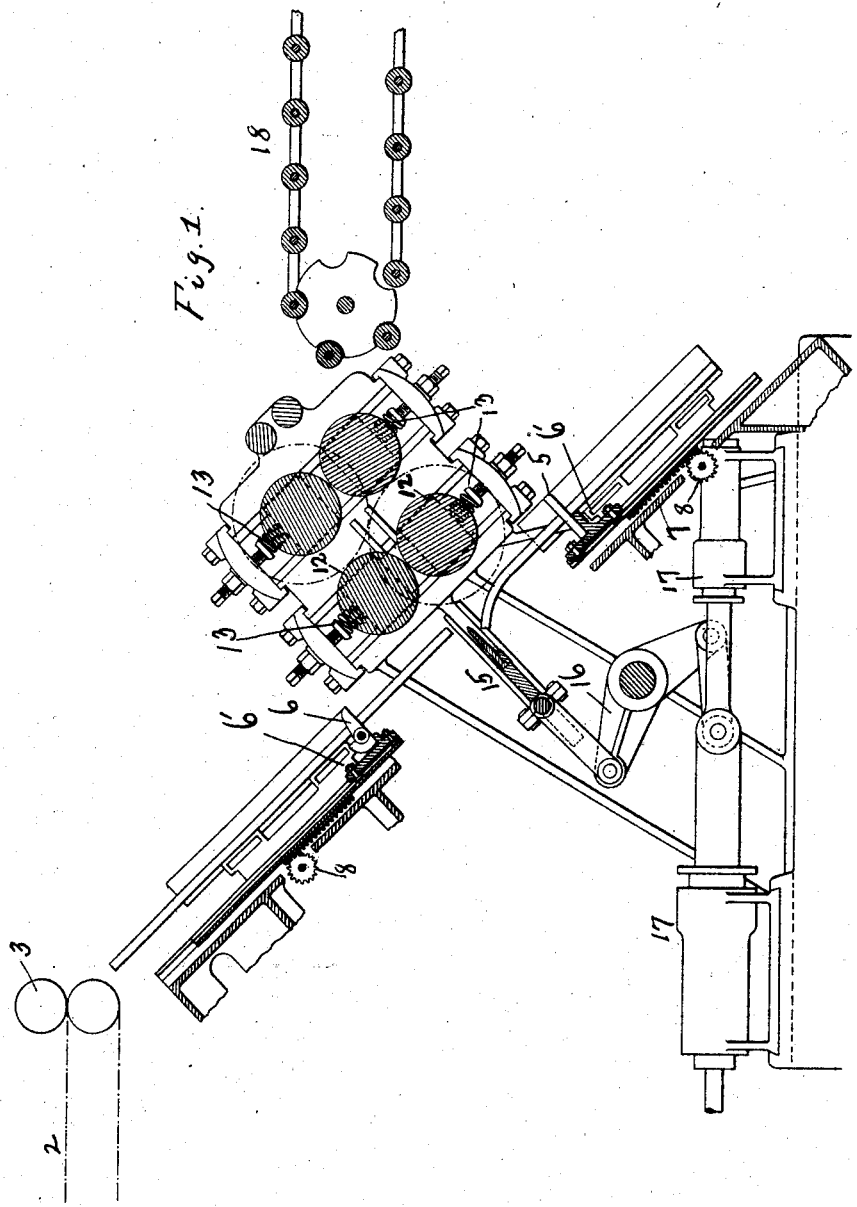
WITNESSES
INVENTOR C. W. BRAY.
MECHANISM FOR DOUBLING OR MATCHING METAL PLATES.
APPLICATION FILED NOV. 17, 1905.
907,121.
Patented Dec. 22, 1908.
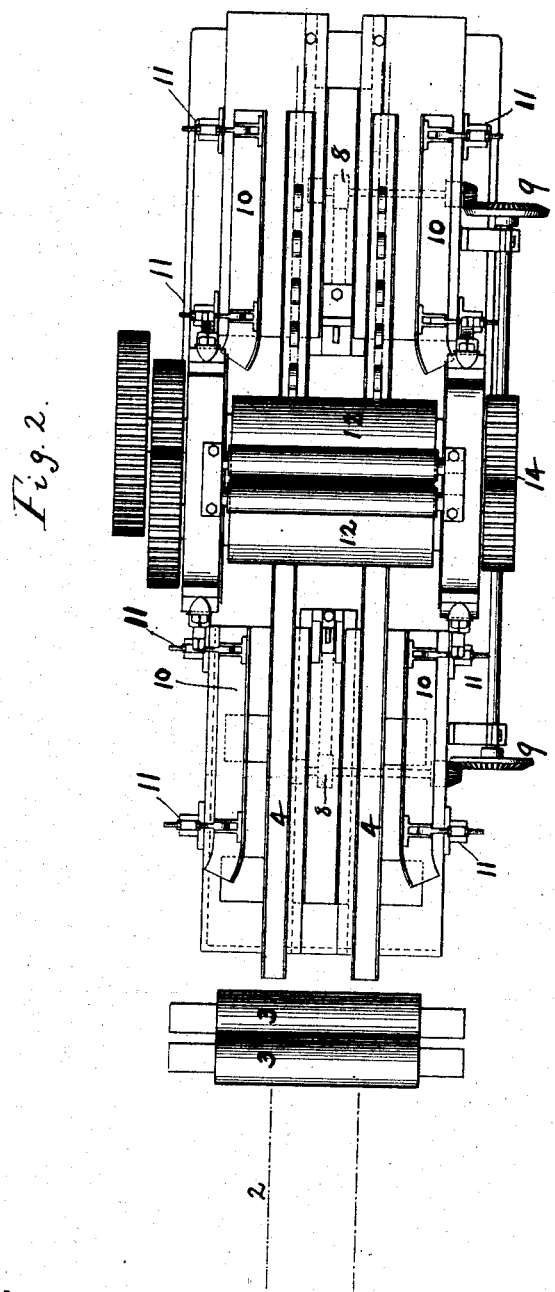
WITNESSES
INVENTOR

UNITED STATES PATENT OFFICE.

CHARLES W. BRAY, OF PITTSBURG, PENNSYLVANIA, ASSIGNOR TO AMERICAN SHEET & TIN PLATE COMPANY, OF PITTSBURG, PENNSYLVANIA, A CORPORATION OF NEW JERSEY.

MECHANISM FOR DOUBLING OR MATCHING METAL PLATES.

No. 907,121.    Specification of Letters Patent.    Patented Dec. 22, 1908.

Application filed November 17, 1905. Serial No. 287,754.

*To all whom it may concern:*

Be it known that I, CHARLES W. BRAY, of Pittsburg, county of Allegheny, State of Pennsylvania, have invented a Mechanism for Doubling or Matching Metal Plates, of which the following is a specification, reference being had to the accompanying drawings, in which—

Figure 1 shows my apparatus in vertical longitudinal section, and Fig. 2 is a plan view thereof.

My invention provides means by which the metal plates to be doubled or matched can be delivered automatically to the machine and then centered therein in proper position for doubling, then doubled and delivered to suitable conveying mechanism by which the doubled plates may be carried to a mill or other suitable place.

In the drawings, 2 represents a feed table leading from the rolling mill and 3 are feed rollers by which the metal plates to be doubled or matched are delivered to the machine.

4—4 are guide-rails which extend downwardly at an inclination from the rolls 3 and deliver the metal plates to the doubling mechanism.

5—5 are movable stops by which the plates are centered in the machine. These stops are preferably mounted upon carriages 6'—6', which are reciprocated by means of racks 7 on their under surfaces, or by other mechanism. The racks are driven by pinions 8—8, the respective pinions being connected by gearing and shafting 9, so that the centering stops will move simultaneously in opposite directions and to an equal extent. These pinions may be operated either by hand mechanism, or by suitable power appliances. The lower stop 5 constitutes a support upon which the lower end of the packs or plates rest as they are delivered into the machine. The angle of inclination of the table of the machine is preferably somewhat greater than the angle of repose, so that the plates will pass down the same by gravity until they engage the lower stop. The table of the machine may be vertical in position.

The table is provided with side guides 10—10, which are adapted to move inwardly by suitable mechanism 11, so as to match the plates laterally on the table and square them at right angles to the doubling mechanism.

This doubling mechanism preferably comprises one or more pairs of rolls 12, backed by springs 13, and driven by suitable gearing 14, and a plunger 15, which is reciprocated back and forth in line with the pass of the rolls by suitable mechanism, such as a rocking-lever 16 and actuating cylinders 17.

In the operation of the device, the plates to be doubled are delivered by the feed rollers 3, either singly or in packs, upon the table of the machine and passed downwardly on this table until they are engaged and arrested by the lower stop 5. They then may be matched and squared laterally on the table by the side guides 4—4 and centered with reference to the doubling mechanism by moving the carriages 6—6 towards each other. The stop of the upper carriage is pivoted to allow the passage of the plates downwardly, but to afford a stop for the ends of the plates when the carriages are brought together. As these carriages are operated by gearing 8—8, connected as above described, and as the stops are moved thereby an equal extent, the plates are centered accurately in the machine with their middle line directly opposite the end of the plunger and when the plunger advances it delivers the middle of the pack into the bite of the rolls, which drawing the same therethrough, completely doubles the pack and delivers it upon the conveying mechanism 18. The advantage of thus having a downwardly directed table for the doubling mechanism is that it renders the action of the machine automatic and certain and enables the machine not only to be used for the doubling of packs, but also for the matching and doubling thereof.

A further advantage of my invention is, that the doubled pack is delivered from the machine outwardly in a direction which approximates the line of feed of the mill.

Within the scope of my invention as defined in the claims, many changes may be made in the arrangement of the parts, since

What I claim is:

1. In sheet metal doubling apparatus, the combination of a pair of doubling rollers arranged at an angle to a vertical plane and one above the other, spaced sheet guides arranged in front of said rollers at an angle to the horizontal, a support for the lower end of the sheet, a pusher blade arranged to move at an angle to a vertical plane, and mechanism for moving said blade to force the intermediate part of the sheet between doubling rollers, substantially as described.

2. In sheet metal doubling apparatus, the combination of two pairs of doubling rollers arranged in tandem with their axes and one roller of each pair above the other, spaced sheet guides arranged in front of said rollers at an angle to the horizontal which is greater than the angle of repose, a support for the lower end of the sheet, a pusher blade mounted to move at an angle to a vertical plane, and mechanism for moving said pusher blade to force the intermediate part of the sheet between the doubling rollers, substantially as described.

3. In sheet metal doubling apparatus, the combination with a pair of doubling rollers arranged at an angle to a vertical plane and one above the other, spaced sheet guides arranged in front of said rollers at an angle to the horizontal, a support for the lower ends of the sheets, means for matching the side edges of the sheets, a pusher blade mounted to move at an angle to a vertical plane, and mechanism for moving said pusher blade to force the intermediate part of the sheets between the doubling rollers, substantially as described.

4. In sheet metal doubling apparatus, the combination of a pair of doubling rollers arranged horizontally and one above the other, spaced sheet guides arranged at an angle to the horizontal in front of said rollers, stops for engaging the top and bottom ends of the sheets, mechanism for simultaneously moving said top and bottom stops toward and from each other, a pusher blade mounted to move at an angle to the vertical, and mechanism for moving said pusher blade to force the intermediate part of the sheet between the doubling rollers, substantially as described.

5. In a sheet metal doubling apparatus, the combination of a pair of doubling rollers, sheet guides in front of said rollers, a pusher blade arranged to force the intermediate parts of the sheets between said rollers, means for matching the side edges of the sheets, and mechanism contacting with the ends of the sheets for centering them with reference to the doubling blade, substantially as described.

6. In a sheet metal doubling apparatus, the combination of a pair of doubling rollers arranged horizontally and one above the other, spaced sheet guides arranged vertically in front of said rollers, a vertically movable stop for the end of the sheet, a pusher blade mounted to move horizontally and mechanism for moving said pusher blade to force the intermediate part of the sheet between the doubling rollers, substantially as described.

7. In sheet metal doubling apparatus, the combination of a pair of doubling rollers, a pusher blade arranged to force the intermediate parts of the sheets between said rollers, movable side stops for contacting with the side edges of the sheet, and mechanism controllable independently of the pusher blade for centering the sheets with reference to the doubling blade, substantially as described.

8. In sheet metal doubling apparatus, the combination of a pair of doubling rollers with their axes horizontal and in an inclined plane, spaced sheet guides in front of the rollers and arranged at an inclined angle, a support for the lower end of the sheet, a pusher blade arranged to move in a horizontally inclined angle, and mechanism for moving said pusher blade to force the intermediate part of the sheet between the doubling rollers.

9. In doubling apparatus for metal sheets, a doubling mechanism, stops on opposite sides of the doubling mechanism, and connections arranged to move the stops toward each other to an equal extent, one set of stops being yielding to allow entrance of the sheet, substantially as described.

In testimony whereof, I have hereunto set my hand.

CHARLES W. BRAY.

Witnesses:
GEORGE H. SONNEBORN,
H. M. CORWIN.